(12) United States Patent
Gabriel et al.

(10) Patent No.: US 8,438,147 B2
(45) Date of Patent: May 7, 2013

(54) MEDIA CONTENT SEARCHING AND NOTIFICATION

(75) Inventors: Michael Gabriel, Greenwich, CT (US); Bruce Probst, Croton-On-Hudson, NY (US); Jeffrey Dibartolomeo, Merrick, NY (US)

(73) Assignee: Home Box Office, Inc., New York, NY (US)

( * ) Notice: Subject to any disclaimer, the term of this patent is extended or adjusted under 35 U.S.C. 154(b) by 1739 days.

(21) Appl. No.: 10/674,680

(22) Filed: Sep. 29, 2003

(65) Prior Publication Data

US 2005/0071323 A1  Mar. 31, 2005

(51) Int. Cl.
G06F 17/30 (2006.01)

(52) U.S. Cl.
USPC ........... 707/706; 707/722; 707/723; 707/725; 707/732

(58) Field of Classification Search .................... 725/93, 725/37–59; 709/228; 707/1, 104.1, 3, 706, 707/722, 723, 725, 732
See application file for complete search history.

(56) References Cited

U.S. PATENT DOCUMENTS

| 5,003,384 | A | 3/1991 | Durden et al. |
| 5,353,121 | A | 10/1994 | Young et al. |
| 5,621,456 | A | 4/1997 | Florin et al. |
| 6,029,195 | A | 2/2000 | Herz |
| 6,144,376 | A | 11/2000 | Connelly |
| 6,199,077 | B1 | 3/2001 | Inala et al. |
| 6,591,245 | B1 | 7/2003 | Klug |
| 2001/0037348 | A1 | 11/2001 | Nakada et al. |
| 2002/0057297 | A1 | 5/2002 | Grimes et al. |
| 2002/0059163 | A1 | 5/2002 | Smith et al. |
| 2002/0065802 | A1* | 5/2002 | Uchiyama ........................ 707/1 |
| 2002/0069404 | A1 | 6/2002 | Copeman et al. |
| 2002/0078382 | A1* | 6/2002 | Sheikh et al. ................. 713/201 |
| 2002/0154157 | A1* | 10/2002 | Sherr et al. .................... 345/716 |
| 2002/0184195 | A1 | 12/2002 | Qian |
| 2003/0046150 | A1* | 3/2003 | Ader et al. ...................... 705/14 |
| 2003/0093794 | A1 | 5/2003 | Thomas et al. |
| 2003/0208767 | A1* | 11/2003 | Williamson et al. ............ 725/93 |
| 2004/0003097 | A1* | 1/2004 | Willis et al. ................... 709/228 |
| 2004/0205614 | A1* | 10/2004 | Keswa .......................... 715/523 |
| 2004/0221308 | A1 | 11/2004 | Cuttner et al. |

OTHER PUBLICATIONS

*Internet Movie Database*; retrieved Aug. 28, 2003, from http://www.imdb.com.
*IMDB Name and Title Search*; retrieved Aug. 28, 2003, from http://www.imdb.com/Find.
*IMDB: Shrek (2001)*; retrieved Aug. 28, 2003, from http://www.imdb.com/title/tt0126029.
*IMDB: Merchandise for Shrek (2001)*; retrieved Aug. 28, 2003, from http://www.imdb.com/title/tt0126029/sales.
*IMDB: My Movies*, retrieved Aug. 28, 2003, from http://www.imdb.com/Errors/register_for_my_movies.

(Continued)

*Primary Examiner* — John E Breene
*Assistant Examiner* — Dennis Myint
(74) *Attorney, Agent, or Firm* — Kenyon and Kenyon LLP

(57) ABSTRACT

A system and method for searching for media content. A user profile is received from a user. The user profile identifies preferred media sources. A search request is received from the user including at least one search criteria. The search for media content is based on the at least one search criteria and the user profile. Information regarding the media content found from the search is displayed to the user.

1 Claim, 8 Drawing Sheets

OTHER PUBLICATIONS

*IMDB: Cinema—Shrek (2001)*; retrieved Aug. 28, 2003, from http://www.imdb.com/title/tt0126029/cinemashowtimes.

*IMDB: Cinema Showtimes*; retrieved Aug. 28, 2003, from http://www.imdb.com/Showtimes.

*IMDB: On TV Links for Shrek (2001)*; retrieved Aug. 28, 2003, from http://www.imdb.com/title/tt0126029/ontelevision.

*IMDB: Registration*; retrieved Aug. 28, 2003, from http://www.imdb.com/register.

*IMDB: Help—IMDB History*; retrieved Aug. 28, 2003, from http://www.imdb.com/help/Oweek/history.

*IMDB Pro: Subscribe*; retrieved Aug. 28, 2003, from http://www.secure.imdb.com/register/subscribe7c=a394d4442634f6f6c6.

European Search Report for EP 04023142.

* cited by examiner

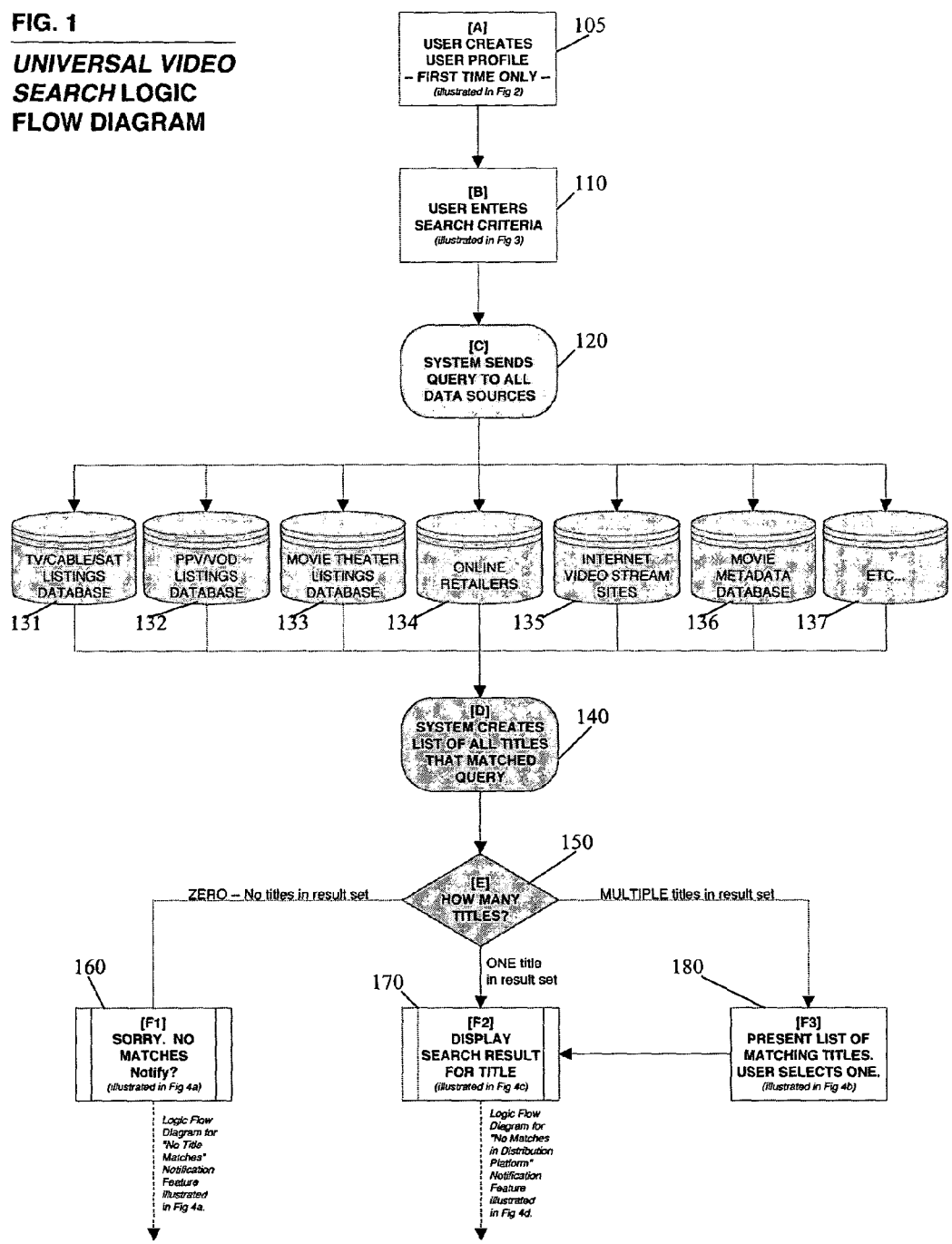

FIG. 2

SAMPLE *USER*
*PROFILE* SCREEN

---

User Profile — 200

Enter Your ZIP/Postal Code

11566

— 210

Select Your Cable TV Provider

Based on the ZIP/Postal Code you entered above, the following is a list of local cable and satellite TV providers. Please select your provider from the list:

Cablevision of Hauppauge

— 220

Select Preferred Movie Theaters (optional)

Based on the ZIP/Postal Code you entered above, the following is a list of local movie theaters. Un-check any theaters that you want to exclude from your searches.

- ☑ Merrick Cinemas 15 Fisher Avenue, Merrick, NY, 0.4 miles
- ☑ Bellmore Movies 222 Petite Ave, Bellmore, NY, 1.4 miles
- ☑ United Artists Meadowbrook 2549 Hempstead Tpke, East Meadow, NY, 3.9 miles
- ☑ Loews Cineplex Nassau Mall 3585 Hemstead Tpke, Levittown, NY, 4.4 miles

— 230

Select Preferred Online DVD/VHS Retailers (optional)

Un-check any online retailers that you want to exclude from your searches.

- ☑ Amazon.com
- ☑ CD Universe
- ☑ CD Baby

— 240

Enter Your Email Address (optional)

Enter your email address if you'd like to use the Notification Service:

john.doe@hbo.com

— 250

Save — 260

FIG. 3

SAMPLE *SEARCH*
*CRITERIA* FORM

Enter Search Criteria — 300

What Would You Like To Search For?

Movie / Program Title — 310

Cast Members (separate multiple actors with 'AND') — 320

Director / Crew Members (separate multiple names with 'AND') — 330

Where Would You Like To Search?

- ☑ My Basic TV / Cable TV / Satellite TV Provider
- ☐ Pay-Per-View (PPV) at My Cable Provider
- ☐ Subscription Video-On-Demand (SVOD)
- ☑ My Preferred Movie Theaters
- ☑ My Preferred Online DVD/VHS Retailers
- ☐ My Preferred Internet Video Streaming/Download Sites

Begin My Search! — 342

340

**SAMPLE *SEARCH RESULTS* SCREEN AND NOTIFICATION FEATURE LOGIC FLOW DISPLAYED WHEN NO TITLES MATCHED QUERY**
*(Logic Flow Step F1 in Fig. 1)*

SAMPLE INTERMEDIATE *SEARCH RESULTS* SCREEN
DISPLAYED WHEN MULTIPLE TITLES MATCHED QUERY
*(Logic Flow Step F3 in Fig. 1)*

SAMPLE *SEARCH*
*RESULTS* SCREEN

SAMPLE NOTIFICATION FEATURE LOGIC FLOW DISPLAYED WHEN NO MATCHES FOUND IN A PARTICULAR DISTRIBUTION CHANNEL
*(After Logic Flow Step F2 in Fig. 1)*

MEDIA CONTENT SEARCHING AND NOTIFICATION

FIELD OF THE INVENTION

The present invention relates to media content searching and notification. In an example embodiment, a Universal Video Search Portal may be provided that allows a consumer to search for particular media content using a variety of search criteria across many different distribution channels.

BACKGROUND INFORMATION

Videos and other media content may be distributed via many different distribution channels, for example, broadcast television, cable television, satellite television, video-on-demand (VOD), pay-per-view (PPV), movie theaters, VHS, DVD and CD sales, radio, and Web-based video and/or audio streaming or download sites, etc. These distribution channels may allow a consumer to search for specific media content within that distribution channel, as illustrated in the following examples:

Example A: Cable or satellite TV consumers may manually search through a program guide on their set-top boxes. Set-top boxes may offer full featured search capabilities which may allow the consumer to search for a particular title that is being offered within his or her cable system. From the search results screen, if a match has been found, the consumer is informed as to when the title will be shown and on which TV channel.

Example B: Consumers who would like to purchase a particular title on DVD or VHS may visit one of many online retailers (for example, Amazon.com, CDUniverse.com, etc.) and search for a particular title using search tools on those Web sites. From the search results screen, if a match has been found, the consumer may then purchase the title.

Example C: Currently, consumers who would like to attend a movie showing in a theater may determine where and when the movie will be playing by either manually viewing movie listings in the newspaper or by going to a Web site like MovieFone.com.

However, we are not aware of a central location or source where consumers may search for media content across many or all of these distribution channels, or a manner by which the consumer may be notified if the title (media content) becomes available at a later date (if no match for media content has been found during a search), in the manner of the present invention.

SUMMARY

In accordance with an example embodiment of the present invention, a system and method are provided for media content research and notification. The system and method of the present invention may be implemented as a Universal Video Search Portal that may allow a consumer to search for particular media content (e.g., movie, television show, etc.) using a variety of search criteria across many different distribution channels. These distribution channels may include, for example, broadcast television, cable television, satellite television, video-on-demand (VOD), pay-per-view (PPV), movie theaters, VHS, DVD and CD sales, book sales, radio and Web-based video and/or audio streaming or download sites, etc.

The system and method of the present invention may be implemented using an executable application on a user's computer and/or as part of an Internet Web site. In addition, the system and method of the present invention may be implemented as a hardware-implemented computer-readable storing medium storing a set of instructions, the set of instructions capable of being executed by a processor. Also, the system and method of the present invention may be implemented as a built-in application in a cable or satellite TV set-top box. The method and system of the present invention may be implemented in any other manner, currently known or unknown, that provides similar functionality.

The system and method of the present invention may provide a Universal Video Search Portal by applying a consumer's search criteria to multiple data sources (e.g., databases). For example, the system and method of the present invention may query the user's cable TV provider's TV listings, query all movie theaters in the user's area, query online VHS and DVD retailers, query Web-based video streaming or download sites, and query the user's local video rental shop.

After all queries are complete, the system and method of the present invention may return one comprehensive Search Results screen that indicates all sources where the media content is available. From this Search Results screen, depending on the implementation of the present invention, the consumer may perform one of many tasks, including ordering a DVD, ordering movie theater tickets, etc.

If the specific media content is not currently available on one or more of the distribution channels, the system and method of the present invention also provides a Notification capability that notifies the user via email, instant message, postal mail, etc. when the media content becomes available.

BRIEF DESCRIPTION OF THE DRAWINGS

FIG. 1 illustrates one possible logic-flow for the Universal Video Search process.

FIG. 2 illustrates an example screen for completing a User Profile.

FIG. 3 illustrates an example Search Criteria Form.

DETAILED DESCRIPTION

Figure 4A:
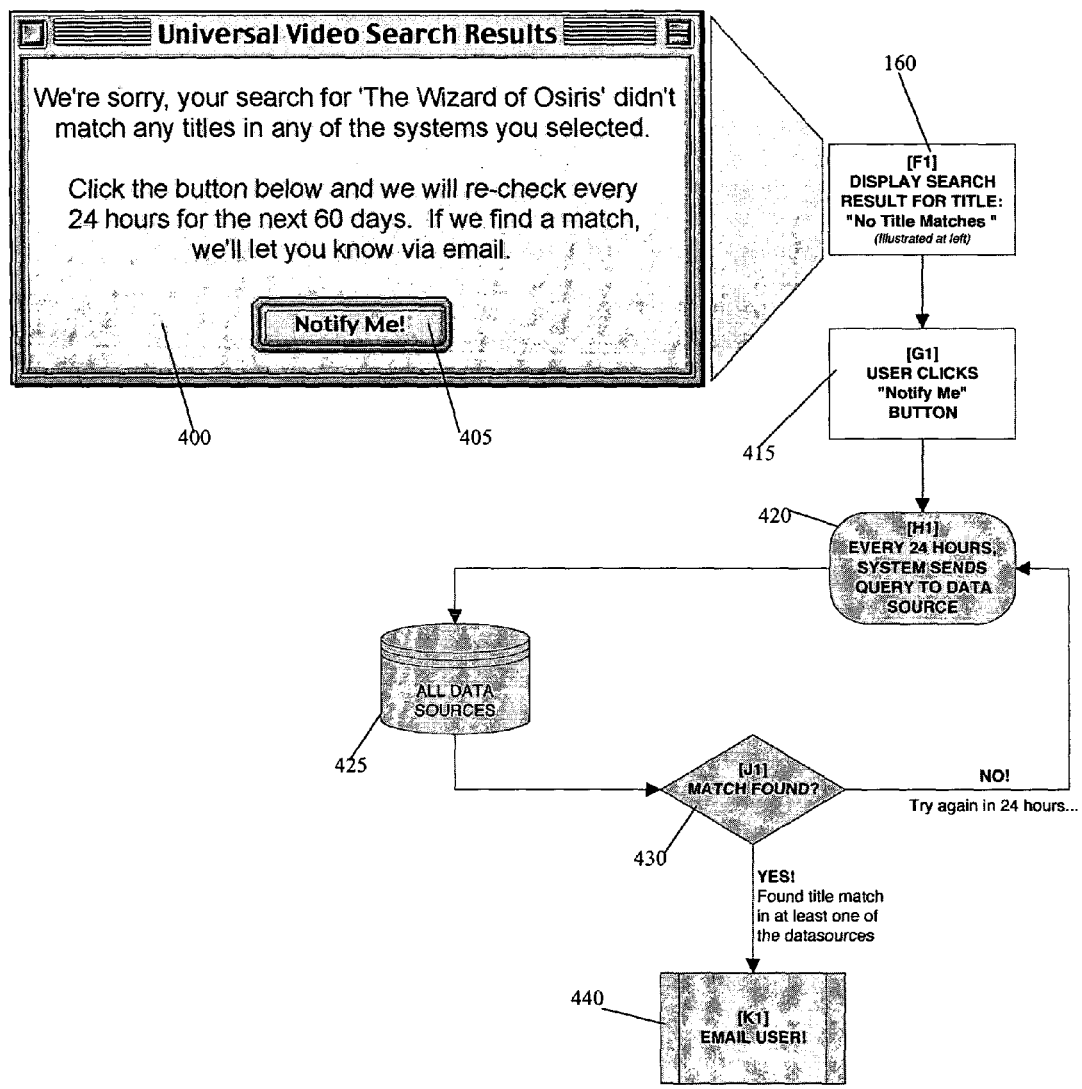
FIG. 4a illustrates an example of a Search Results screen that a user would see if no titles matched her search query, and provides one possible logic-flow diagram for the Notification feature that would be offered in this circumstance.

In accordance with an example embodiment of the present invention, a system and method is provided for media content searching and notification. Media content may include, for example, video, audio, printed material (data), still images (pictures), text, movies, television programs, etc. The system and method of the present invention may be implemented as a Universal Video Search Portal that may allow a consumer to search for particular media content using a variety of search criteria across many different distribution channels. These distribution channels may include, for example, broadcast television, cable television, satellite television, video-on-demand (VOD), pay-per-view (PPV), movie theaters, VHS, DVD, CD and book sales, and Web-based video and/or audio streaming or download sites, etc.

User Profile

In one example embodiment of the present invention, a User Profile is utilized in order to tailor searches and search results to the specific user. The User Profile may be created using information provided by the user via, for example, a displayed form.

FIG. 2 shows an example of a User Profile form implemented as a Web page. The User Profile form 200 may include a user's ZIP/Postal Code field 210. Based on a zip code entered into the ZIP/Postal Code field 210 by the user, the user may be provided with a drop-down menu 220 from which the user's local cable and/or satellite TV provider may be selected. In an alternative example embodiment, if the User Profile form is implemented in the user's cable or satellite set-top box, it is possible that the ZIP/Postal code, and cable or satellite TV provider, are known at the onset.

As shown in FIG. 2, the User Profile form 200 may also provide the user with the opportunity to identify other preferred media sources. In this example, a user may identify preferred movie theaters and preferred online DVD/VHS retailers via for example check boxes 230, 240. In this example embodiment, a list of possible preferred movie theaters is determined based upon the user's zip code. In other example embodiments, the user may identify other preferred media sources such as preferred online retailers, preferred radio stations, at least one movie theater, etc. Additionally, in other example embodiments (implemented, for example, on the Internet), the user may provide URLs of preferred online media content sources.

In the example embodiment shown in FIG. 2, the User Profile form 200 may include a field 250 for entering the user's email address. This email address may then be used in connection with, for example, a Notification feature described in detail below.

By clicking on the Save button 260 on the User Profile form 200 the user stores the user profile on, for example, the user's local computer, at a Web site (e.g., at a server of a search service provider), or on the user's set-top box. Clicking on the Save button causes the local computer, Web site, server, or set-top box to receive a User Profile.

In an alternate embodiment, a User Profile may be automatically generated without the user expressly inputting the information. A User Profile may be created on the basis of previous searches conducted by the user. For example, if a user regularly searches for sports related media content, a User Profile is automatically generated that associates the user to sporting events. An automatically generated User Profile associated with sporting events may be used to notify the user of media content related to sports that the user may be interested in. Also, the User Profile may be created on the basis of previous media content consumption habits of the user. For example, if a user regularly watches TV game shows, a User Profile is automatically generated that associates the user to TV game shows. An automatically generated User Profile associated with TV game shows may be used to notify the user of media content related to TV game shows that the user may be interested in. This alternate embodiment may be implemented on set-top TV boxes, Web sites, and on other devices that provide the capability to track and record a user's media content searches and media content consumption habits. Also, automatically generated User Profiles may be used in conjunction with the information provided by the user as described above in reference to FIG. 2.

Search Criteria

After providing the relevant data for the User Profile, the user may provide search criteria for specific media content to a search engine via a Search Criteria Form.

FIG. 3 illustrates an example of a Search Criteria Form 300. In an example embodiment, the Search Criteria Form 300 may include a "Movie/Program Title" data field 310 into which a user may input a title (e.g., "Wizard of Oz"). Additional fields may be provided to give the user more search capabilities and flexibility, such as, for example, "Cast Member" data field 320, "Director/Crew Members" data field 330, etc.

The Search Criteria Form 300 may also include search selection check boxes 340 that allow the user to select the distribution channels (e.g., preferred media sources) for searching. In this example, the user has indicated the desire to search "My Basic TV/Cable TV/Satellite TV Provider" (e.g., the local cable or satellite TV provider indicated in the User Profile); "My Preferred Movie Theaters" (e.g., the movie theaters indicated in the User Profile); and "My Preferred Online DVD/VHS Providers" (e.g., the DVD/VHS retailers indicated in the User profile).

By clicking on the "Begin Search" button 342 on the Search Criteria Form 300, a search engine receives the search request (including the search criteria). Once the search request (including the search criteria) is provided to the search engine, the search engine then bases the search on the search criteria and the User Profile. The search engine may execute, for example, on the user's computer or set-top box, or a server of a search service provider.

Search Results

After the search is complete, a Search Results screen is displayed. The "Search Results" screen displays information regarding the media content to the user. There are many different possible approaches to the configuration and functionality offered on the Search Results screen. The information regarding the media content and the Search Results screen may be displayed on a display associated with a set-top box, a display of a computer arrangement, a TV, a wireless device, and/or a cell phone.

Figure 4B:
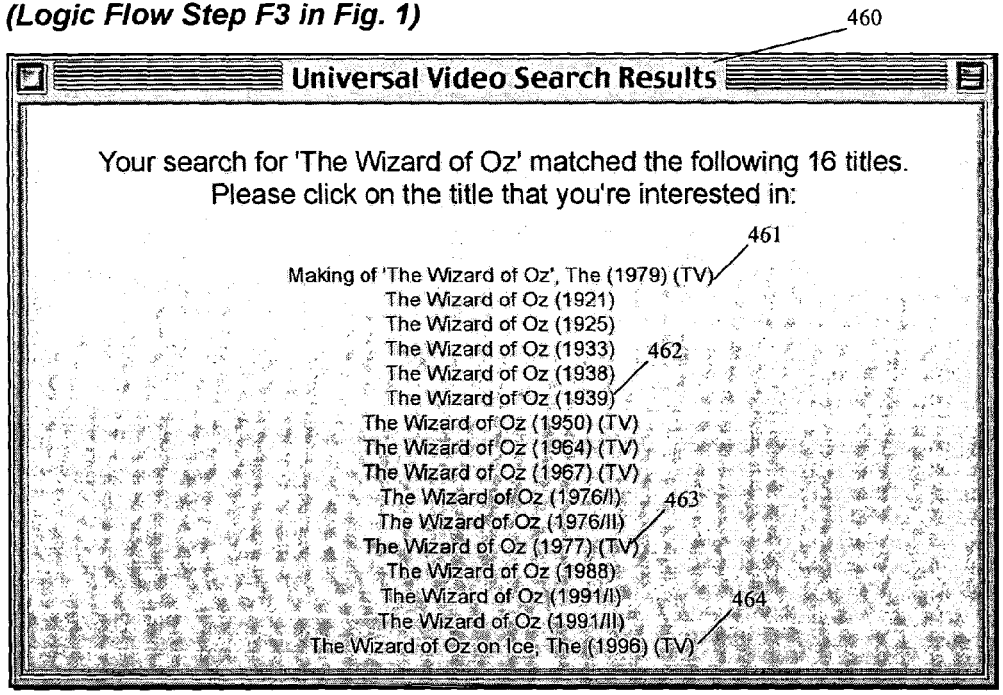
FIG. 4b illustrates an example of an intermediate Search Results screen that a user would see if multiple titles matched her search query.
Figure 4C:
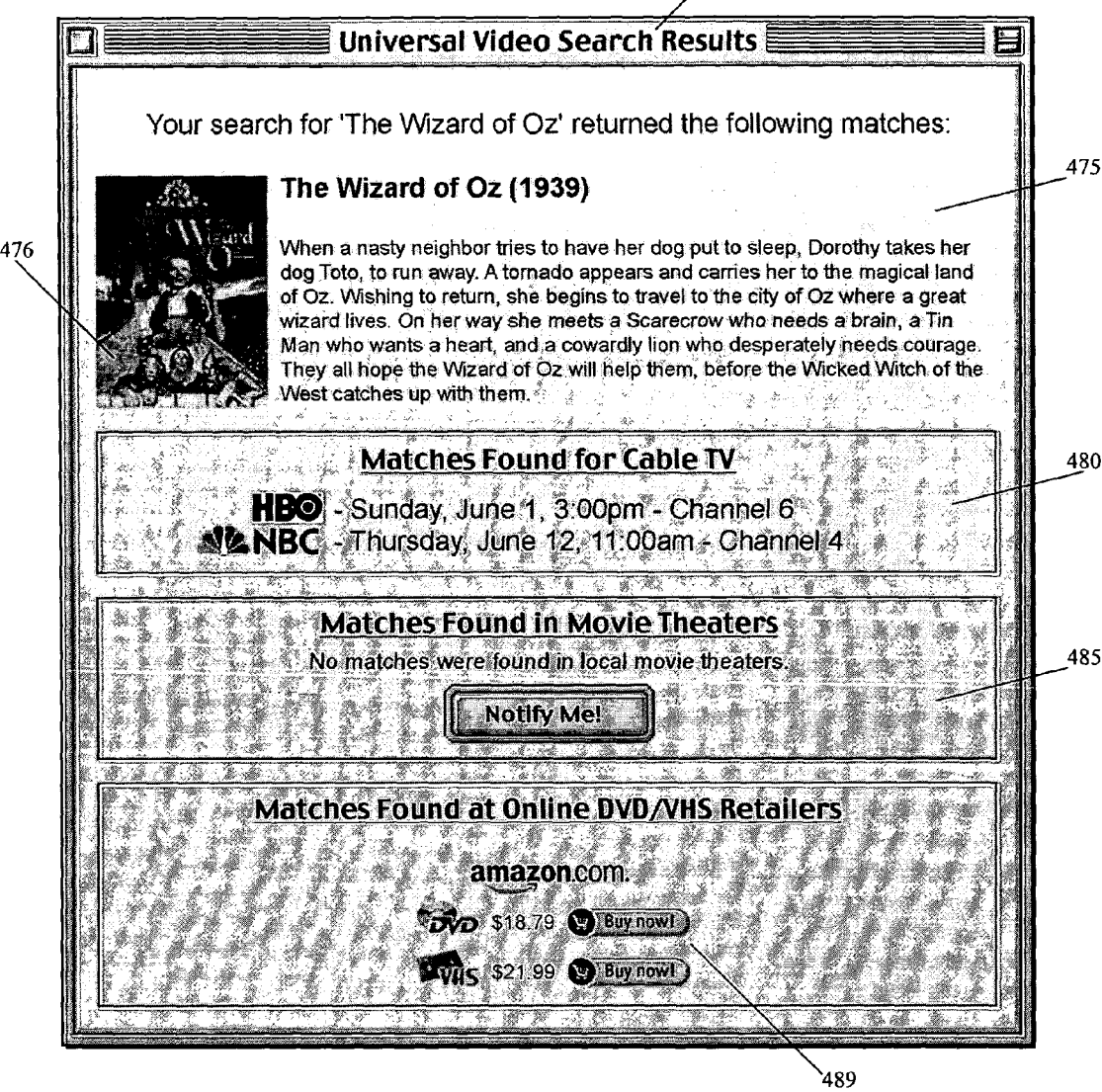
FIG. 4c illustrates an example Search Results screen for a particular title.

FIG. 4c illustrates a "feature-rich" Search Results screen 470 that provides a synopsis field 475 that may include a photo/image 476 and text relating to the media content. The Search Results screen also displays matches found for each of the distribution channels selected by the user. In other words, availability information, regarding media content for which the user has searched, from the preferred media content sources, is displayed to the user. The availability information indicates the availability of media content, which meets the at least one search criteria, from at least one of the preferred media sources. For example, in this example embodiment, the Search Results screen displays, on a single page, "Matches Found for Cable TV" 480, "Matches Found in Movie Theaters" 485 and "Matches Found at Online DVD/VHS Retailers" 489. In this example embodiment, two matches were found for the "Wizard of Oz" on cable TV, no matches were found in movie theaters (i.e., the "Wizard of Oz" is not currently available in any of the preferred movie theaters) and the "Wizard of Oz" is available on both DVD and VHS at one of the user's preferred online retailers.

Tasks

In accordance with the example embodiment, if matches are found, the user may be provided the ability to perform certain tasks. For example, in the example, matches were found at an online retailer. Accordingly, the user is provided the ability to order the "Wizard of Oz", on DVD or VHS via a "Buy Now" button 489. Similarly, if matches had been found in movie theaters, the user would be provided the ability to buy tickets to the movie theater online. If matches were found at a concert hall, the user would be provided the ability to buy tickets to the concert hall. The ability to purchase or acquire other merchandise related to the media content (here, the "Wizard of Oz") may be provided. Hence, the method and system of the present invention, provides online purchase capabilities such that the user is able to purchase at least one of the media content, tickets to view or hear the media content, and merchandise related to the media content.

Notification

A notification feature according to the present invention allows for notifying the user in the future when the media content becomes available from at least one of the preferred media sources, if the media content is not currently available from the at least one of the preferred media sources. Also, the user may be notified in the future when the media content becomes available from at least one non-preferred media source. The user may be notified via at least one of email, instant message, and postal mail.

As shown in FIG. 4c, if no matches are found for a particular distribution channel (e.g., in this case, no matches were found for preferred movie theaters), a "Notify Me" button 485 is displayed. Upon clicking the "Notify Me" button 485, the user requests notification if the media content for which the user searched becomes available from the particular distribution channel. In this case, if the user clicks the "Notify Me" button 485, the user is notified if the "Wizard of Oz" becomes available at any of the preferred movie theaters. Of course, the notification feature may also be offered for other distribution channels. For example, "Notify me when this title becomes available on DVD."

In the example embodiment, the user may be notified via an email message (e.g., addressed to the email address in the User Profile). Alternatively, the user may be notified via an instant message, postal mail, a telephone call, printed notification included in the user's cable bill, etc. (Addresses, screen names, a telephone call, etc. for notification purposes, may also be stored in the User Profile and may be acquired in a manner similar to that discussed above in connection with the user's email address).

Figure 4D:
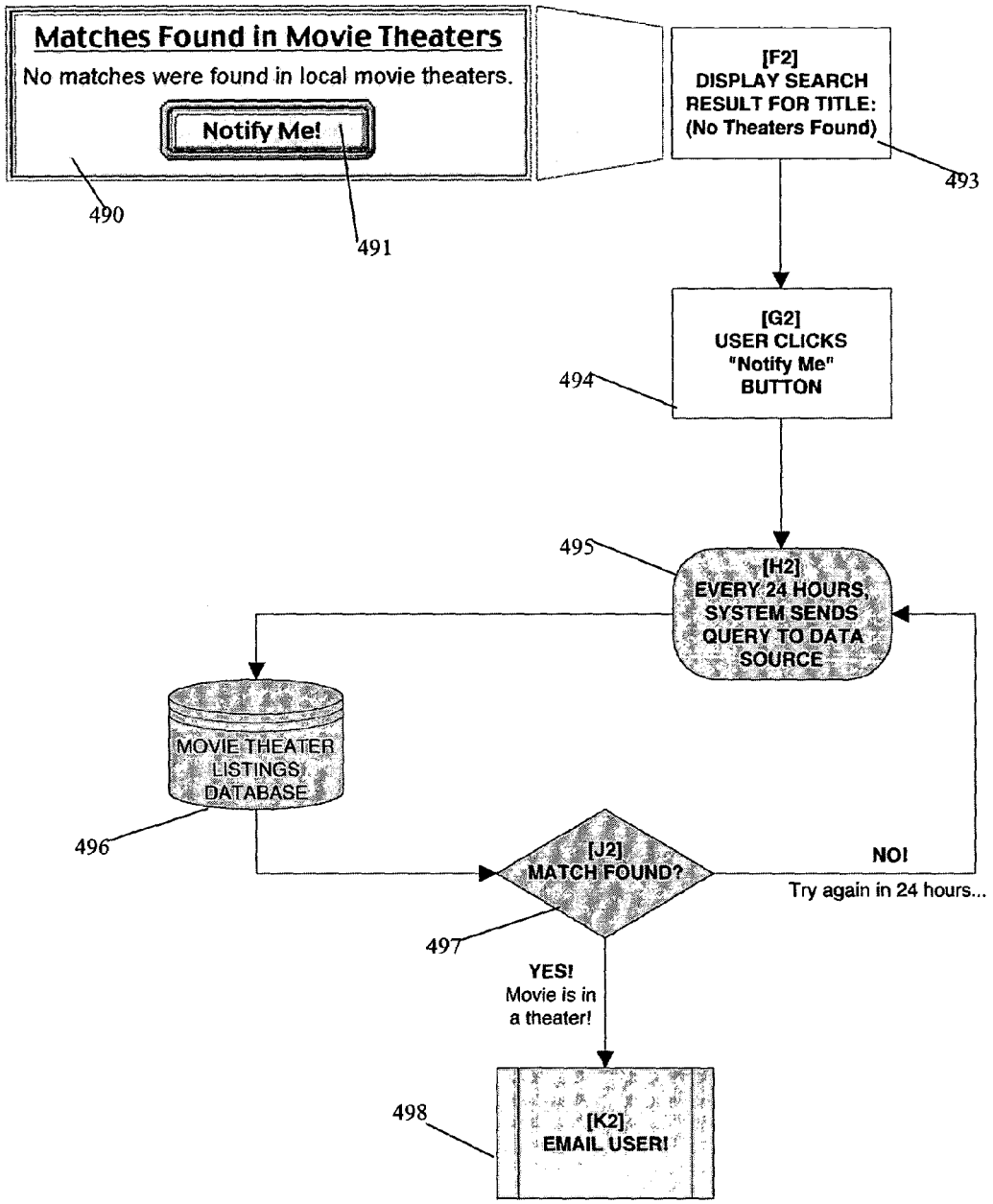
FIG. 4d illustrates one possible logic-flow diagram for the Notification feature that would be offered if no matches are found in a particular distribution channel for a specific title.

FIG. 4d shows further details of the Notification feature in accordance with an example embodiment of the present invention. If, for example, no matches were found for a particular distribution channel (e.g., preferred movie theaters), a message is displayed to the user that no matches were found for the distribution channel (e.g., 490) and a "Notify Me" button 491 is displayed. The user then may click (via, for example, a mouse) on the "Notify Me" button 494, in response to which a periodic query (i.e., search) is scheduled (for example, on a server). In this case, every 24 hours, a database storing information regarding the content source provider for the distribution channel (e.g., a movie theater listings database 496) is queried 495. (The frequency of the queries may, of course, be adjusted.) If a match is found 497 (e.g., for the "Wizard of Oz,") the user is notified as discussed above 498. Otherwise, the query remains scheduled.

FIG. 4a shows an example of finding no matches in connection with any of the selected distribution channels. In this case, the user searched for "The Wizard of Osiris." In this example, no matches were found in any of the selected distribution channels; accordingly, a message (no matches found) 400 and the "Notify Me" button is displayed 160 to user. If the user clicks on the "Notify Me" button 420, the user will be notified if and when the title is eventually offered in any of the selected (preferred) distribution channels. In another example embodiment, the user will be notified when the title is available in even non-preferred distribution channels. This may be particularly useful in the case of a very rare title or a new title that has not yet been released.

In this example, after the user clicks 415 on the "Notify Me" button 405, a periodic query is scheduled. In this case, all data sources 425 are queried every 24 hours for 60 days. If a match is found 430, the user is notified accordingly 440; otherwise, the query remains scheduled. In one example embodiment, a user may set the frequency and duration of the queries in the User Profile, or may provide the settings after clicking on the "Notify Me" button 405.

In another embodiment, a user may request (e.g., via clicking on an appropriate button) the search engine to suggest media content (such as a movie) based on (instead of or in addition to the User Profile and search criteria provided by the user) the user's viewing habits, previous user-entered search criteria, past purchases of the user, and/or past activity on the user's computer and/or set-top box. This may be implemented in a similar fashion as the Notification feature. That is, data sources may be queried on a scheduled (or even a one-time only) basis. Also, the search engine may suggest media content based on the automatically generated User Profile described above.

Intermediate Search Results

In accordance with the example embodiment of the present invention, it is possible that multiple titles match the user's search criteria. Accordingly, an intermediate search results screen 460 may be displayed listing all titles that matched, as shown in FIG. 4b. Selecting one of the titles 461, 462, 463, 464 in the intermediate search results screen 460 would then display the detailed Search Results Screen 470 for that title, as shown in FIG. 4c.

Flowchart of Overall System

FIG. 1 illustrates a flowchart of the overall system. As shown, in FIG. 1, a first-time user creates a User Profile 105 (as described above in connection with FIG. 2). This User Profile may be subsequently modified at any time. The User Profile may be stored on the user's local computer or set-top box, or may be stored on a server (e.g., a Web site server). In step 110, the user enters at least one search criteria (as described above in connection with FIG. 3).

After entering the search criteria, the search criteria is provided to a search engine. The search for media content is performed on at least one database. Based on the search criteria and the User Profile, the search engine queries the appropriate databases which contain information regarding availability of media content from various media content sources. Examples of these databases include a TV/Cable/Satellite Listings Database 131, a Pay-Per-View/Video-On-Demand Listings Database 132, Movie Theater Listings Database 133, Online Retailers Database 134, Internet Video Stream Sites Database 135, a Movie MetaData Database 136, and/or any other type of distribution channel database 137. In the example embodiment, some or all of these databases may be checked, depending on, for example, if the user is searching only preferred distribution channels. The search engine may also check databases at URLs provided by the user.

In step 140, a list of all titles matching the query is created. In step 150, a determination as to the number of matching titles is made. If no matching titles are found, step 160 is performed. In step 160, a No Search Results and Notification Screen 400 is presented to the user as described above in reference to FIG. 4a.

In step 170, if one matching title is found, a Search Results Screen 470 is presented to the user as described above in reference to FIG. 4c. The Search Results Screen 470 is used to display information regarding the media content (e.g., regarding the title) to the user. Information displayed includes availability information that indicates availability of the media content searched for, which meets the at least one search criteria, from the preferred media sources.

In step 180, if multiple matching titles are found, an Intermediate Search Results screen 460 is presented to the user as described above in reference to FIG. 4b.

Block Diagram of Overall System

Figure 5:
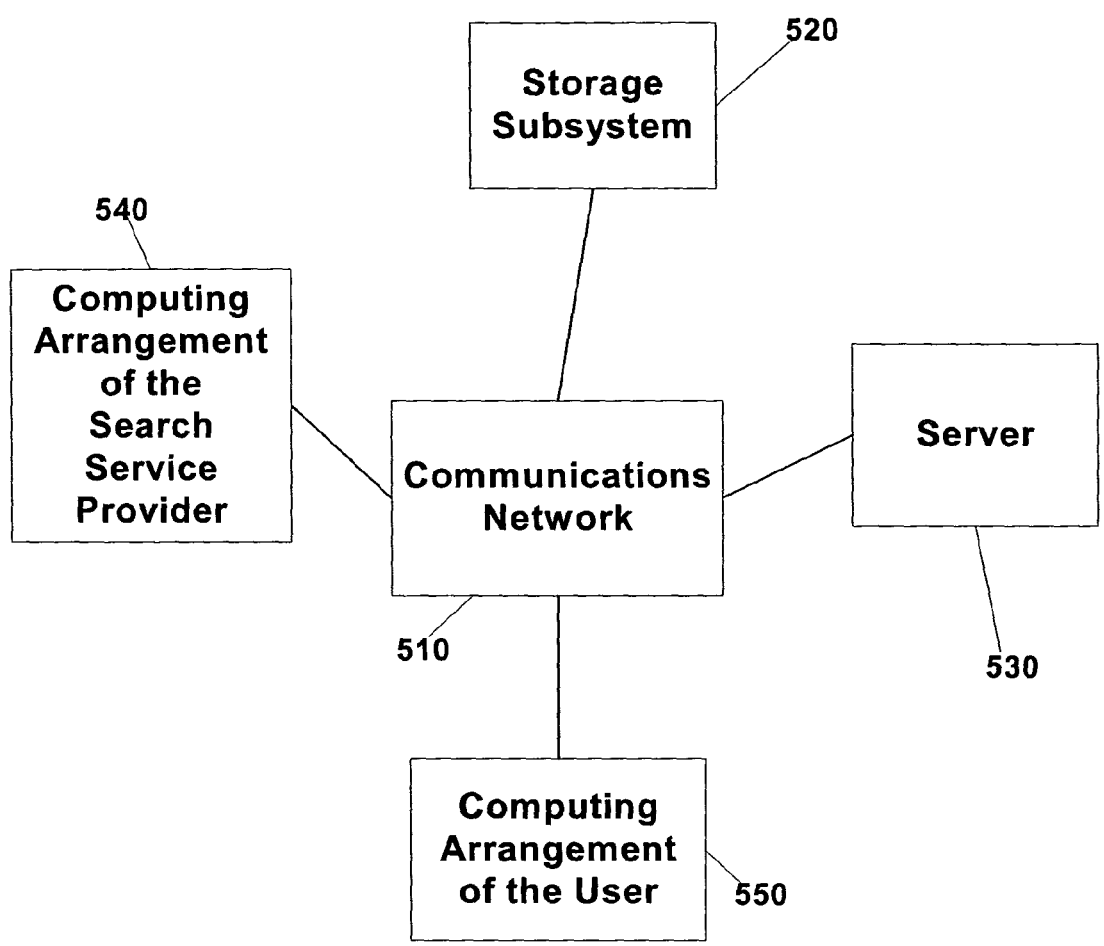
FIG. 5 shows a block diagram of an example system according to the present invention.

FIG. 5 shows a block diagram of an example system according to the present invention. In this system, a computing arrangement of a user 550 (e.g., a user's computer with a display, or a set-top box connected to a television) is connected to a computer arrangement of a search service provider 540 (e.g., a server including a search engine) via a communications network 510 (e.g., the Internet, a cable network, a telephone or cellular network, a wired or wireless computing network, etc.). The computer arrangement of the user 550 stores the User Profile, described above (although the User Profile may also be stored in other locations such as, for example, at the computing arrangement of the search service provider 540).

In operation, a search engine at the computer arrangement of the search service provider 540 searches the appropriate databases for information regarding media content, based on at least one search criteria and based on the User's Profile. The databases may be located remote from the computing arrangement of the search service provider 540, for example, at storage subsystem 520, at another server 530, or may be local to the service provider.

Results of the searches are displayed to the user at a display at the computer arrangement of the user 550.

The system may be, of course, configured in many different ways. For example, the search engine may execute at the computing arrangement of the user 550.

What is claimed is:

1. A computer-implemented method for searching for media content, comprising:
   receiving, by a processor and from a user, a user profile which identifies preferred media distribution sources which are of a plurality of media distribution source types;
   receiving, by the processor, a search request from a user including at least one search criteria;
   searching, by a processor, the preferred media distribution sources for media content based on the at least one search criteria and the user profile, wherein the searching includes searching based on the identification of the preferred media distribution sources of the user profile;
   if the searching returns results:
      generating, by the processor and from the results of the searching, a schedule including scheduling information regarding the media content of the returned results; and
      displaying the schedule to the user; and
   if the searching does not return any results:
      periodically searching, by the processor, the plurality of media distribution source types for media content, the periodic searching being unconstrained by at least one of the at least one search criteria, the user profile, and the identification of the preferred media distribution sources of the user profile; and
      responsive to a return of results by the periodic searching:
         generating, by the processor and from the results of the periodic searching, the schedule; and
         displaying the schedule to the user.

* * * * *